G. N. PIFER.
PHOTOGRAPHIC APPARATUS.
APPLICATION FILED JUNE 11, 1917.
1,347,824.
Patented July 27, 1920.
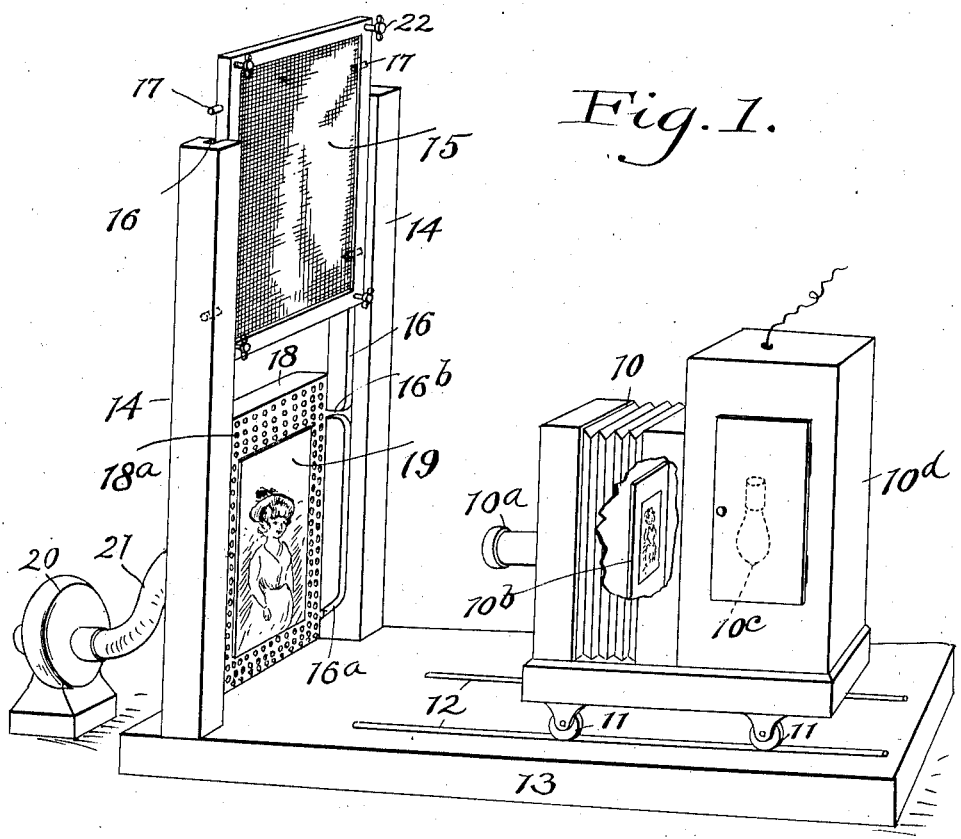
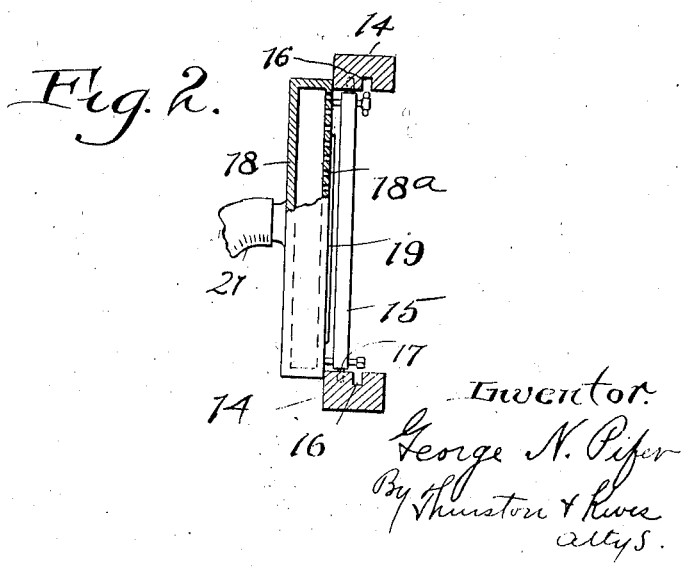
Inventor.
George N. Pifer
By Thurston & Rwee
attys.

UNITED STATES PATENT OFFICE.

GEORGE N. PIFER, OF CLEVELAND, OHIO, ASSIGNOR TO THE POSTERGRAPH COMPANY, OF CLEVELAND, OHIO, A CORPORATION OF OHIO.

PHOTOGRAPHIC APPARATUS.

1,347,824.  Specification of Letters Patent.  Patented July 27, 1920.

Application filed June 11, 1917. Serial No. 173,954.

*To all whom it may concern:*

Be it known that I, GEORGE N. PIFER, a citizen of the United States, residing at Cleveland, in the county of Cuyahoga and State of Ohio, have invented a certain new and useful Improvement in Photographic Apparatus, of which the following is a full, clear, and exact description.

This invention relates to photographic apparatus and especially to certain forms thereof wherein photographic impressions or exposures are adapted to be made on large sensitized sheets through a screen such as a half-tone screen. While of general application in engravers' cameras, my invention has particular utility in making enlargements on a large flexible surface which must be held in very precise relation to the interposed screen.

The chief object of the invention is to provide a practical means for handling or supporting large sheets of sensitized paper or film in proper relation to the screen, or to support and position the flexible sheet and screen in their required relationship to obtain the best results.

I accomplish this result through the medium of air pressure, preferably by utilizing a holder in the form of a shallow flat receptacle from which the air is adapted to be withdrawn by a suction fan or the like, and having a flat perforated front wall against which the sheet is held by suction, and I provide means whereby the screen may be supported in very close proximity to the perforated side or face of the holder, so that the sheet is held absolutely flat at all points thereof, and parallel to the surface of the screen, it being virtually impossible for any part of the sheet to touch the screen or to be located at any point more or less than the predetermined distance. Additionally the suction serves to hold, or assists in holding the screen as well as the flexible sheet in proper position as will be explained.

The invention may be further briefly summarized as consisting in certain novel details of construction and combinations and arrangements of parts which will be described in the specifications and set forth in the appended claims.

In the accompanying sheet of drawings Figure 1 is a perspective view of an enlarging camera equipped with my invention; and Fig. 2 is a plan view of the forward portion of the apparatus with the screen in operative position, parts being in section.

In the drawings 10 represents an enlargement camera with lens $10^a$, negative $10^b$ and lamp $10^c$, the lamp being in a light tight compartment $10^d$. Preferably the camera 10 is mounted on rollers 11, fitted to tracks 12 which may be secured to a base 13. This enables the camera 10 to be easily shifted to any desired distance from the sensitized sheet on which the exposure, on this the enlargement, is to be made.

Forwardly of the camera at the front end of the base 13 are two uprights 14 which act as a supporting frame and guideway for a screen 15, in this instance a half tone screen, which is designed to be moved vertically, the uprights having on their inner or adjacent sides, guide grooves 16 which receive pins 17 projecting from the edges of the screen 15. At their lower ends the grooves have downwardly and rearwardly inclined portions $16^a$, and a suitable distance above they have rearward extensions $16^b$, these portions being traversed by the lower and upper sets of guide pins 17 of the screen and permitting the screen to closely approach the sensitized sheet when the screen is lowered, and to be raised and lowered without touching the sensitized sheet.

Behind the uprights 14 is a holder 18 for the flexible sensitized sheet which is shown at 19. This holder consists of a shallow rectangular receptacle against the front face of which the sheet is adapted to be held by air pressure or by suction, the front face of the holder 18 being absolutely flat or as near flat as it is possible to get it in practice. The front wall of the holder or receptacle is provided with a large number of perforations $18^a$ and the sensitized sheet is held absolutely flat against the same by reducing the air pressure within the receptacle by means of a small motor driven fan or suction blower 20 which is connected to the receptacle by a tube 21.

In the use of this apparatus before the enlargement is made and before the sensitized sheet is placed against the front wall of the holder, the screen will be in elevated position, as shown in Fig. 1. To make an enlargement the motor fan is started, and the sensitized sheet which will usually be of large proportions, is placed against the perforated wall of the holder 18, and due to the partial vacuum in the chamber the sheet will be held absolutely flat against the holder in the manner illustrated in Fig. 1. Then the screen is lowered and when the lower guide pins 17 reach the lower inclined portion 16ª of the guide grooves, the screen swings inward very close to the holder and sheet 19.

The screen will not engage the sheet, being spaced therefrom a predetermined distance by adjusting screws 22 which extend through the corners of the screen and bear against the marginal portions of the holder 18, the intervening space being very slight,—a small fraction of an inch. The frame swings inward to proper position with respect to the holder and sensitized sheet automatically, and is firmly held in that position by the suction of the air which therefore performs two functions, namely, it forms a perfect flat lay of the flexible sensitized sheet against the holder, and holds the screen up against the holder, but with a very slight space between the sensitized surface of the sheet and the adjacent surface of the screen; in other words, the suction holds both the sensitized sheet and the screen in proper relation to each other.

When the screen is properly positioned the lens is opened, and the enlargement is made on the sensitized surface through the screen. This will be done of course in a dark room so that the sensitized surface will not be affected by any light rays except those passing through the negative 11ᵇ and lens 10ª.

With this apparatus exceedingly good results are obtained,—better in fact, than have heretofore been obtained, so far as I am aware, on large sensitized flexible sheets employed in connection with a half tone screen. These excellent results are obtained by reason of the fact that the sensitized surface at no point touches the screen, although the latter may be positioned exceedingly close thereto, and because all points of the sensitized surface are precisely the same distance from the screen.

I have experimented with many other schemes or devices for holding the paper and positioning the paper and screen, but without obtaining as effective results as with the apparatus herein disclosed, for regardless of how carefully the paper was stretched or mounted the sensitized surface and adjacent surface of the screen could not be made as truly parallel nor could the screen be made to approach so closely to the surface without touching the sensitized surface at any point as with the suction method of holding the sentitized sheet and screen in proper relationship as disclosed herein.

Having described my invention, I claim:

1. A photographic apparatus such as herein described, a flat rigid support for a flexible sensitized sheet, a flat screen adapted to be positioned close to the support and parallel thereto, and means whereby a sensitized sheet placed against the holder and the screen are held in proper relationship with respect to each other by air pressure.

2. In photographic apparatus such as herein disclosed, a perforated flat holder for a sensitized sheet, means for holding a sensitized sheet against the perforated face of the holder by air pressure, a screen adapted to be positioned in front of and close to said sheet and holder, and supporting means for the screen permitting the screen to be raised and lowered with respect to the sheet and holder.

3. In photographic apparatus such as herein described, a flat perforated holder for a sensitized sheet, means for creating a suction through the holder whereby sensitized sheet is held flat against the holder, a screen, and upright supports for the screen, said supports and screen having coöperating guideways permitting the screen to be raised and lowered and be moved inward in close proximity to the holder and sensitized sheet.

4. In photographic apparatus such as herein described, a flat holder for a sensitized sheet, a flat half tone screen, upright supports for the screen, said screen and supports having guideways by which the screen may be raised and lowered and when lowered to be moved inward in close proximity to the holder, and means whereby the screen and a sensitized sheet placed against the holder between the holder and screen are held in parallel relationship by air pressure.

5. In photographic enlarging apparatus such as herein described, a flat rigid holder for a sensitized sheet on which a photographic exposure is adapted to be made, a flat half tone screen, upright supports for the screen, said screen and supports having guideways by which the screen may be raised and lowered and when lowered to be moved inward in close proximity to the holder, means whereby the screen and a sensitized sheet placed against the holder between the holder and screen are held in parallel relationship by air pressure.

In testimony whereof, I hereunto affix my signature.

GEORGE N. PIFER.